(12) United States Patent
Xie et al.

(10) Patent No.: US 10,480,750 B2
(45) Date of Patent: Nov. 19, 2019

(54) SOLAR SPECTRUM-LIKE LED STRUCTURE

(71) Applicant: Shenzhen Keweitian Eco-Lighting Co., LTD, Guangdong (CN)

(72) Inventors: Rui Xie, Guangdong (CN); Liling Lin, Guangdong (CN)

(73) Assignee: Shenzhen Keweitian Eco-Lighting Co., LTD, Guangdong (CN)

( * ) Notice: Subject to any disclaimer, the term of this patent is extended or adjusted under 35 U.S.C. 154(b) by 90 days.

(21) Appl. No.: 15/510,060

(22) PCT Filed: Sep. 9, 2014

(86) PCT No.: PCT/CN2014/086090
§ 371 (c)(1),
(2) Date: Mar. 9, 2017

(87) PCT Pub. No.: WO2016/037306
PCT Pub. Date: Mar. 17, 2016

(65) Prior Publication Data
US 2017/0299148 A1    Oct. 19, 2017

(51) Int. Cl.
*F21V 9/00* (2018.01)
*F21V 9/02* (2018.01)
(Continued)

(52) U.S. Cl.
CPC ............. *F21V 9/02* (2013.01); *A01G 7/045* (2013.01); *A01M 29/10* (2013.01); *F21S 2/00* (2013.01);
(Continued)

(58) Field of Classification Search
CPC ............. F21Y 2107/50; F21Y 2107/80; F21Y 2107/90; F21V 9/02
See application file for complete search history.

(56) References Cited

U.S. PATENT DOCUMENTS 5,838,247 A    11/1998 Bladowski
2002/0006040 A1    1/2002 Kamada et al.
(Continued)

FOREIGN PATENT DOCUMENTS

CN    1319740 A    10/2001
CN    1778148 A    5/2006
(Continued)

OTHER PUBLICATIONS

International Search Report for International Application No. PCT/CN2014/086090 dated Jun. 8, 2015, 3 pages.
(Continued)

*Primary Examiner* — Gerald J Sufleta, II
(74) *Attorney, Agent, or Firm* — TraskBritt

(57) ABSTRACT

A solar spectrum-like LED structure, comprising a negative electrode for a three-dimensional integrated package, and a plurality of LED chips and resistors. The negative electrode for a three-dimensional integrated package is a three-dimensional structure comprising a plurality of planes. The plurality of LED chips is installed on the plurality of planes of the negative electrode for the three-dimensional integrated package. Light of different colors emitted by the plurality of LED chips forms a plane light source or a cone light source after being well mixed at an intersection point, thus simulating a solar spectrum. The invention enables manufacturing of a solar spectrum-like LED fluorescent lamp suitable for generating different bands of spectrums for the survival and metabolism of various organisms. In addition, the solar spectrum-like LED fluorescent lamp has a good color-rendering property and visual effect, and can be widely applied in the fields of general lighting, agriculture, animal husbandry and new biological energy sources.

7 Claims, 5 Drawing Sheets

(51) Int. Cl.
*F21V 29/00* (2015.01)
*F21S 2/00* (2016.01)
*F21S 4/00* (2016.01)
*A01G 7/04* (2006.01)
*A01M 29/10* (2011.01)
*H05B 33/08* (2006.01)
*F21Y 113/13* (2016.01)
*F21Y 115/10* (2016.01)
*F21Y 107/50* (2016.01)

(52) U.S. Cl.
CPC ............... *F21S 4/00* (2013.01); *F21V 29/00* (2013.01); *H05B 33/0857* (2013.01); *F21Y 2107/50* (2016.08); *F21Y 2113/13* (2016.08); *F21Y 2115/10* (2016.08)

(56) References Cited

U.S. PATENT DOCUMENTS

| | | | |
|---|---|---|---|
| 2004/0213017 A1 | 10/2004 | Chou et al. | |
| 2004/0263094 A1 | 12/2004 | Lister | |
| 2009/0135608 A1 | 5/2009 | Sell | |
| 2013/0294065 A1* | 11/2013 | Wells | F21V 29/02 362/231 |
| 2015/0131290 A1* | 5/2015 | Speer | H05K 1/189 362/285 |
| 2015/0237687 A1* | 8/2015 | Zeng | G02F 1/133603 349/69 |
| 2015/0292686 A1* | 10/2015 | Negley | F21V 3/0625 315/34 |

FOREIGN PATENT DOCUMENTS

| | | |
|---|---|---|
| CN | 2886307 Y | 4/2007 |
| CN | 101510545 A | 8/2009 |
| CN | 101764067 A | 6/2010 |
| CN | 101790264 A | 7/2010 |
| CN | 203351595 U | 12/2013 |
| CN | 203489025 U | 3/2014 |
| CN | 103982797 A | 8/2014 |
| DE | 102012109149 A1 | 3/2014 |
| EP | 1411290 A1 | 4/2004 |
| JP | 2007-273559 A | 10/2007 |
| WO | 20110354490 A1 | 3/2011 |

OTHER PUBLICATIONS

International Written Opinion for International Application No. PCT/CN2014/086090 dated Jun. 8, 2015, 6 pages.
European Search Report and Search Opinion Received for EP Application No. 14901704.8, dated Mar. 26, 2018, 8 pages.
CN First Search for CN Application No. 201480078723.1 dated Jul. 20, 2018; 2 pages.
CN First Office Action for CN Application No. 201480078723.1 dated Jul. 31, 2018; 17 pages.
Chinese Second Office Action for Chinese Application No. 201480078723.1, dated Feb. 14, 2019, 21 pages with English Translation.

* cited by examiner

SOLAR SPECTRUM-LIKE LED STRUCTURE

CROSS-REFERENCE TO RELATED APPLICATIONS

This application is a national phase entry under 35 U.S.C. § 371 of International Patent Application PCT/CN2014/086090, filed Sep. 9, 2014, designating the United States of America and published as International Patent Publication WO 2016/037306 A1 on Mar. 17, 2016.

TECHNICAL FIELD

The present invention relates to the field of LED lighting and, more particularly, to a solar spectrum-like LED structure.

BACKGROUND

White LED lighting, known as the fourth generation of lighting source, has the advantages of solidified, small size, low heat, low power consumption, long life, fast responding speed and environmental, and is expected to be widely applied in the fields of general lighting and backlight sources in the future. In particular, white LED lighting, since it satisfies the requirements of energy saving and environmental protection of the green lighting projects, it is expected to be widely used in the future. However, the light principle of semiconductor LEDs determines that the emitted light can only be monochromatic light, while visible sunlight is a colorful spectrum composed of the colors of red, orange, yellow, green, cyan, blue and purple. It is obvious that a semiconductor LED light source only having a monochromatic light is not suitable for the field of general lighting. If the semiconductor LED light source is required to use for the field of general lighting, the defect of monochrome light emitting must be overcome through the application of other technologies. White LED technology is a typical representative of the transformation of LED monochrome light; the purpose thereof is to make the LED light source close to the natural sunlight color, thereby making it useful in the field of general lighting.

Presently, in the manufacture of white LEDs at home and abroad, fluorescent material is a very important technology. White light is generated almost completely by using yellow phosphor combined with blue light. The property and preparation process of the fluorescent material directly affects the luminous efficiency, conversion efficiency, color coordination, color temperature and color-rendering property of the white LED. In actual application, the fluorescent material of the current white LED uses the amorphous phosphor as the main body. Generating a white light by the combination of single chip and phosphor is still the mainstream of the development of the general white light LED product. However, there are still several technical problems to be solved in the process of producing LEDs by using phosphor technology at the present stage of white LED: 1) the excitation efficiency and light conversion efficiency of phosphor are low; 2) the phosphor particles and dispersal uniformity issues are difficult to be effectively and completely solved; 3) phosphor lacks the red light-emitting component, it is difficult to produce a white LED with low color temperature and high color-rendering index; 4) the high light attenuation of phosphor leads to a shortened white LED life; and 5) phosphor has a poor physicochemical property that is unsuitable for the development requirement of the high-power LED. Under the influence of these problems of the properties of phosphor, the solving of the problems of white LED such as luminous efficiency, color-rendering property, life, high-power application and the like have encountered technical bottlenecks. This situation shows that the bottleneck of LED development increasingly highlighted that phosphor cannot meet the requirements of existing white LED and adapt to the future development trend of LED fluorescent lamp.

In the existing mixed LED white light technology, the white light is generated by a mixed light made by two or three complementary two-color LED light-emitting diodes or three primary color light-emitting diodes (LEDs). This technology generally uses only a simple mixing structure to obtain the mixed light, its color-rendering property is poor, and it is difficult to meet the practical requirements.

Meanwhile, with the acceleration of the speed of white LED lights coming to the market and the expansion of the application field, it exposed a major application problem of "visual defect" that still existed in the current white LED lights. This defect bears the brunt of the harm and influence to the human eye, attracting the attention and research of the customer and all sectors of the society.

In view of the above problems, the present invention is aimed to design a solar spectrum-like LED structure. A solar spectrum can be simulated by gathering and mixing LED light of different colors. The solar spectrum-like LED structure of the present invention overcomes the technical defect that the traditional white LED technology needs to use phosphor and can simulate a solar spectrum, while, at the same time, has good color-rendering property and visual effect, and can be widely applied in the fields of general lighting, agriculture, animal husbandry and new biological energy sources.

BRIEF SUMMARY

The invention proposes a solar spectrum-like LED structure that overcomes the technical defect that the traditional white LED technology needs to use phosphor and can simulate a solar spectrum, while, at the same time, has good color-rendering property and visual effect, and can be widely applied in the fields of general lighting, agriculture, animal husbandry and new biological energy sources.

The present invention provides a solar spectrum-like LED structure comprising:
- a negative electrode for a three-dimensional integrated package, the negative electrode for a three-dimensional integrated package being a three-dimensional structure comprising a plurality of planes;
- a plurality of LED chips, the plurality of LED chips being installed on a plurality of planes of the negative electrode for the three-dimensional integrated package, each plane being correspondingly installed with one LED chip; and
- a plurality of resistors, one end of each of the plurality of resistors being separately connected to the light-emitting surface of the LED chips, and the other end of each of the plurality of resistors being connected to the positive electrode.

Furthermore, the negative electrode for a three-dimensional integrated package of the present invention is a structure designed and based on a semi-cylindrical surface having a plurality of planes thereon, the lines from the center point of each plane to the center of the designed semi-cylindrical surface being separately perpendicular to each of the corresponding planes. The plurality of LED chips are separately installed on each plane, and each plane is correspondingly installed with one LED chip.

Furthermore, the computational formula of the design radius of the structure designed and based on a semi-cylindrical surface of the present invention is as follows:

$$Ra = \frac{1}{2}(L+M)/\sin\frac{90°}{n}$$

wherein, L is the size of the edge of the LED chip, M is the spacing between the LED chips, n is the number of the LED chips, and Ra is the design radius of the electrode designed and based on semi-cylindrical surface.

Furthermore, the negative electrode for a three-dimensional integrated package of the present invention is a structure designed and based on a semi-spherical surface having a plurality of planes thereon, the apex angles below the plurality of planes being interconnected into a regular polygon. The plane of the regular polygon is parallel to the plane of the designed semi-spherical surface, and the apex angles of the regular polygon are located on the designed semi-spherical surface. Two top apex angles above the plurality of planes are located on the spherical surface where the plane of the designed semi-spherical surface is intersected with the semi-spherical surface. The lines from the center points of the plurality of planes to the center of the designed semi-spherical surface are separately perpendicular to each of the corresponding planes. The plurality of LED chips are separately installed on each plane, and each plane is correspondingly installed with one LED chip.

Furthermore, the computational formula of the design radius of the structure designed and based on a semi-spherical surface of the present invention is as follows:

$$Ra = \frac{1}{2}(L+M)\sqrt{\frac{1}{4}\left[\tan\frac{90°(n-2)}{n} + \sqrt{\left(\tan\frac{90°(n-2)}{n}\right)^2 + 8}\right]^2 + 1}$$

wherein, L is the size of the edge of the LED chip, M is the spacing between the LED chips, n is the number of LED chips, n≥3, and Ra is the design radius of the electrode designed and based on the semi-spherical surface.

Furthermore, the negative electrode for a three-dimensional integrated package of the present invention is a three-dimensional structure of any shape comprising a plurality of planes. The lines from the center points of the plurality of planes to the designed intersection point are separately perpendicular to each of the corresponding planes. The plurality of LED chips are separately installed on each plane, and each plane is correspondingly installed with one LED chip.

Furthermore, the plurality of resistors of the present invention are a plurality of variable resistors. The spectrum of the mixed light can be varied by the manner of varying the resistance value of the plurality of resistors, varying the current through the corresponding LED chips, and controlling the proportion of each monochromatic light in the mixed light.

Furthermore, light of a plurality of colors emitted by the plurality of LED chips of the present invention generates a spectrogram of solar spectrum-like lighting, insect-repelling LED fluorescent lamp after being well mixed at the designed intersection point; wherein, in the spectrogram, the radiant flux of the wavelength of 530 nm~590 nm is greater than 50% of the radiant flux of the wavelength of 380 nm~780 nm. The main peak wavelength of the spectrum has a minimum value of 581 nm, a maximum value of 601 nm, and a median value of 591 nm. The radiant flux of the wavelength of 380 nm~480 nm is less than 25% of the radiant flux of the wavelength of 380 nm~780 nm.

Further, light of a plurality of colors emitted by the plurality of LED chips of the present invention generates a spectrum of solar spectrum-like myopia prevention LED fluorescent lamps after being well mixed at the designed intersection point, wherein, in the spectrogram, the radiant flux of the wavelength of 530 nm~590 nm is greater than 50% of the radiant flux of the wavelength of 380 nm~780 nm. The main peak wavelength of the spectrum has a minimum value of 550 nm, a maximum value of 570 nm, and a median value of 560 nm. The radiant flux of the wavelength of 380 nm~480 nm is less than 25% of the radiant flux of the wavelength of 380 nm~780 nm.

The present invention also provides an LED light source module. The LED light source module applies the LED structure as described hereinbelow.

BRIEF DESCRIPTION OF THE DRAWINGS

The Examples of the present invention will be further described below with reference to the drawings, wherein.

DETAILED DESCRIPTION

The present invention will be described in further detail in conjunction with the drawings and specific examples.

Figure 1:
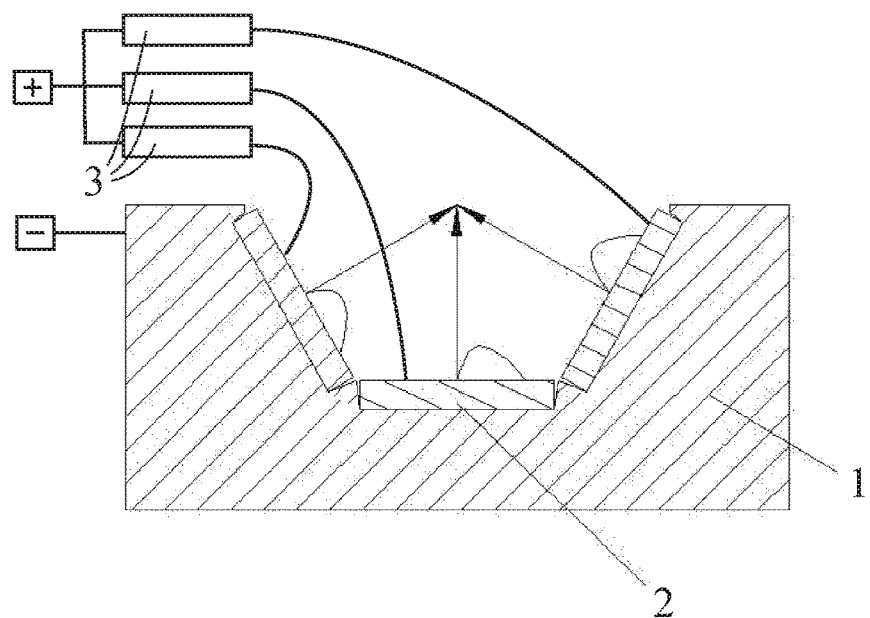
FIG. 1 is a structure diagram of the solar spectrum-like LED structure of the present invention.

The invention provides a solar spectrum-like LED structure. FIG. 1 is a structure diagram of the solar spectrum-like LED structure of the present invention, which comprises a negative electrode (1) for a three-dimensional integrated package, a plurality of LED chips (2), and a plurality of resistors (3). The negative electrode (1) for a three-dimensional integrated package is a three-dimensional structure comprising a plurality of planes. The plurality of LED chips (2) are installed on the negative electrode (1) for the three-dimensional integrated package. One end of each of the plurality of resistors (3) is separately connected to the light-emitting surface of the LED chip, and the other end of each of the plurality of resistors (3) is connected to the positive electrode.

The negative electrode for a three-dimensional integrated package is a structure designed and based on a semi-cylindrical surface, a structure designed and based on a semi-spherical surface or other arbitrary structure, which is neither a structure designed or based on a semi-cylindrical surface nor a structure designed and based on a semi-spherical surface and does not block the light continuing to exposure outside. After mixed at the designed intersection point, having a plurality of planes thereon, the lines from the center points of the plurality of planes to the designed intersection point are separately perpendicular to each of the corresponding planes. The plurality of LED chips (2) are separately installed on each plane, and each plane is correspondingly installed with one LED chip.

Light of different colors emitted by the plurality of LED chips form a plane light source or a cone light source after being mixed at the designed intersection point. Based on the above designed structure, the lights of different colors emitted by the plurality of LED chips (2) are intersected and well mixed at the designed intersection point, thereby emitting a mixed light having a good stability and color-rendering property.

The negative electrode for a three-dimensional integrated package is a structure designed and based on a semi-cylindrical surface. The size of the LED chip is P*L, P≥L, P and L are the sizes of the edge of the chip, the direction of size L is consistent with the circular arc direction of the designed semi-cylindrical surface, the computational formula of the design radius of the electrode designed and based on the semi-cylindrical surface is as follows:

$$Ra = \frac{1}{2}(L+M)/\sin\frac{90°}{n}$$

wherein, L is the size of the edge of the LED chip, M is the spacing between the LED chips, n is the number of the LED chips, and Ra is the design radius of the electrode designed and based on the semi-cylindrical surface.

The negative electrode for a three-dimensional integrated package is a structure designed and based on a semi-spherical surface. The size of the LED chip is P*L, P≥L, P and L are the sizes of the edge of the chip. When P=L, the computational formula of the design radius of the structure designed and based on the semi-spherical surface is as follows:

$$Ra = \frac{1}{2}(L+M)\sqrt{\frac{1}{4}\left[\tan\frac{90°(n-2)}{n} + \sqrt{\left(\tan\frac{90°(n-2)}{n}\right)^2 + 8}\right]^2 + 1}$$

wherein, L is the size of the edge of the LED chip, M is the spacing between the LED chips, n is the number of the LED chips, n≥3, and Ra is the design radius of the electrode designed and based on the semi-spherical surface.

The plurality of resistors is a plurality of variable resistors. The spectrum of the mixed light can be varied by the manners of varying the resistance value of the plurality of resistors, varying the current through the corresponding LED chips, varying the radiant flux of each LED, and controlling the proportion of each monochromatic light in the mixed light. Thus, a solar spectrum-like LED fluorescent lamp for generating different bands of spectrums suitable for the survival and metabolism of various organisms can be separately manufactured.

Example 1

Figure 2:
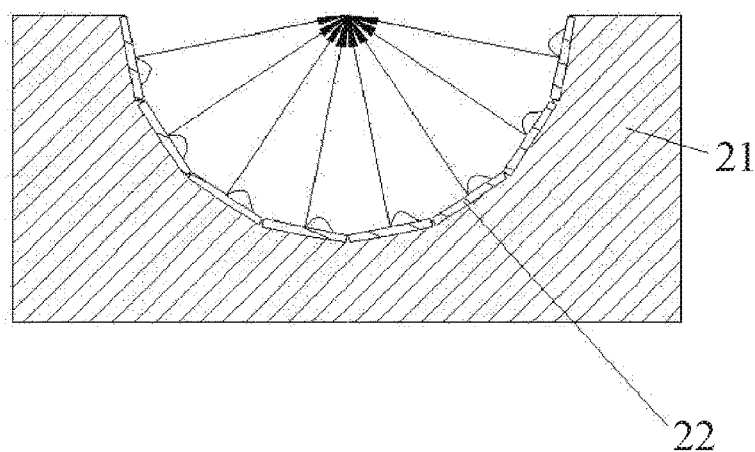
FIG. 2 is a structure diagram of Example 1 of the solar spectrum-like LED structure of the present invention.

FIG. 2 is a structure diagram of Example 1 of the solar spectrum-like LED structure of the present invention, comprising a negative electrode for a three-dimensional integrated package (21) and a plurality of LED chips (22). In order to achieve a solar spectrum-like LED spectrogram required for plant growing, the negative electrode for a three-dimensional integrated package is a structure designed on a semi-cylindrical surface using eight LED chips with different wavelengths.

The negative electrode for a three-dimensional integrated package (21) is a structure design based on the semi-cylindrical surface having a plurality of planes thereon, the lines from the center point of each plane to the center of the designed semi-cylindrical surface were separately perpendicular to each of the corresponding planes. The plurality of LED chips were separately installed on each plane, and each plane was correspondingly installed with one LED chip. The light-emitting surface of the plurality of LED chips (22) were separately faced toward the center of the designed semi-cylindrical surface. The lines from the center point of each light-emitting surface of LED chips (22) to the center of the designed semi-cylindrical surface were separately perpendicular to each of the corresponding light-emitting surfaces, and were intersected at the center of the semi-cylindrical surface. The light of different colors emitted by the plurality of LED chips (22) formed a sector light source at the center of the designed semi-cylindrical surface.

Eight different LED chips with different wavelengths were normal chips with a size of 0.5 mm×0.5 mm, and their wavelength and the corresponding connected multiple resistors are as follows:

|  | LED11 | LED12 | LED13 | LED14 | LED15 | LED16 | LED17 | LED18 |
|---|---|---|---|---|---|---|---|---|
| wavelength (nm) | 660 | 637 | 615 | 596 | 560 | 516 | 462 | 398 |
| resistors | R11 | R12 | R13 | R14 | R15 | R16 | R17 | R18 |

The spacing between the two planes after the package was M=0.15 mm.

According to the size of the selected LED chip, the size of the package plane was designed as 0.6 mm×0.6 mm, L=0.6 mm, the thickness of the electrode was designed as 1.4 mm. According to the computational formula of radius of the structure designed and based on the semi-cylindrical surface, the radius was calculated as R=1.92 mm. Eight square planes of 0.6 mm×0.6 mm were machined on the electrode designed and based on the semi-cylindrical surface of three-dimensional integrated package (21), and the spacing between each two planes was 0.15 mm. The lines from the center points of the eight square planes to the center of the designed semi-cylindrical surface were separately perpendicular to each of the corresponding planes. The substrates of the eight LED chips of LED11-LED18 were separately packaged on eight surfaces of the electrodes, and each plane was correspondingly installed with one LED chip. The light-emitting surfaces of LED11-LED18 were separately faced toward the center of the designed semi-cylindrical surface. The light-emitting surfaces of LED11-LED18 were separately connected to the resistors of R11-R18, and the other end of each of the eight resistors was commonly connected to the positive electrodes of the power source.

Figure 3:
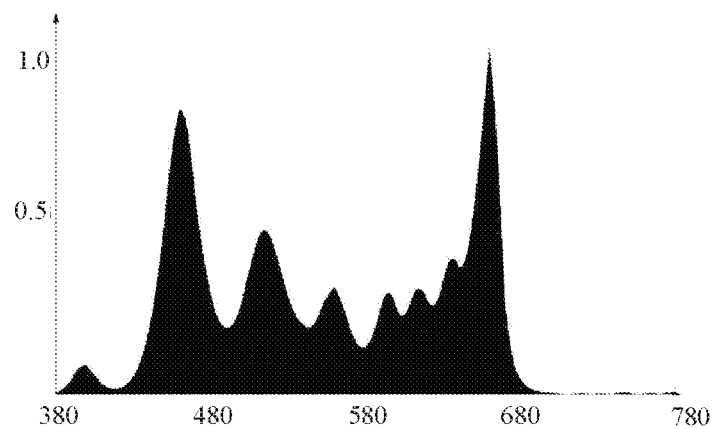
FIG. 3 is a spectrogram of the solar spectrum-like plant-growing LED fluorescent lamp provided by Example 1 of the solar spectrum-like LED structure of the present invention.

After connecting the line to power, eight lights with different color were emitted by LED chips (22) of LED11-LED18 with eight wavelengths, and mixed at the center of the designed semi-cylindrical surface to form a sector light source. A suitable plant-growing LED spectrum can be obtained by adjusting the resistance values of resistors of R11-R18, respectively, and varying the current of LED11-LED18, respectively, thereby changing the proportions of eight lights in the mixed light. FIG. 3 shows a plant-growing spectrogram of Example 1 of the solar spectrum-like LED structure. An FMS-6000 light-color-electricity integrated test system was used for testing. As can be seen from FIG. 3, the present Example can provide a solar spectrum-like LED spectrum suitable for plant growing.

It should be noted that the maximum radiant flux of the blue light flux should be the blue light having a wavelength of 440 nm in the spectrogram of the solar spectrum-like LED fluorescent lamp; however, a blue light chip with a wavelength of 440 nm cannot be purchased at home or abroad. However, the present example can solve this problem well, and provides a solar spectrum-like LED fluorescent lamp suitable for plant growing.

Example 2

Figure 4:
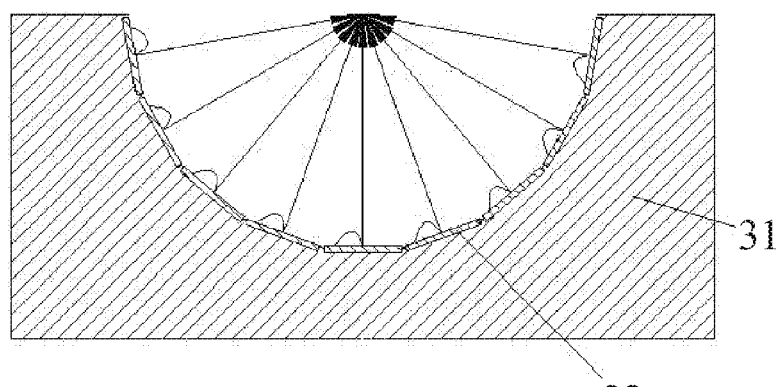
FIG. 4 is a structure diagram of Example 2 of the solar spectrum-like LED structure of the present invention.

FIG. 4 depicts a structure diagram of Example 2 of the solar spectrum-like LED structure of the present invention, comprising a negative electrode for a three-dimensional integrated package (31) and a plurality of LED chips (32). In order to achieve a solar spectrum-like LED fluorescent lamp spectrogram, the negative electrode for a three-dimensional integrated package is a structure based on a semi-cylindrical surface using nine LED chips with different wavelengths.

Nine different LED chips with different wavelengths are normal chips with a size of 0.625×0.5 mm$^2$, and their wavelength and the corresponding connected multiple resistors are as follows:

|  | LED21 | LED22 | LED23 | LED24 | LED25 | LED26 | LED27 | LED28 | LED29 |
|---|---|---|---|---|---|---|---|---|---|
| wavelength (nm) | 660 | 635 | 614 | 595 | 572 | 560 | 516 | 462 | 398 |
| resistors | R22 | R22 | R23 | R24 | R25 | R26 | R27 | R28 | R29 |

The spacing between the two planes after the package was M=0.15 mm. According to the size of the selected LED chip, the size of the package plane is designed as 0.725×0.6 mm$^2$, L=0.6 mm; the thickness of the electrode is designed as 1.6 mm. According to the computational formula of radius of the structure designed and based on the semi-cylindrical surface, the radius was calculated as R=2.16 mm. Nine square planes of 0.75×0.6 mm$^2$ were machined on the electrode design based on the semi-cylindrical surface, and the spacing between each two planes was 0.15 mm. The lines from the center points of the nine square planes to the center of the designed semi-cylindrical surface were separately perpendicular to each of the corresponding planes. The substrates of the nine LED chips of LED21-LED29 were separately packaged on nine surfaces of the electrodes, and each plane was correspondingly installed with one LED chip. The light-emitting surfaces of LED21-LED29 were separately faced toward the center of the designed semi-cylindrical surface. The light-emitting surfaces of LED21-LED29 were separately connected to the resistors of R21-R29, and the other end of each of the nine resistors was commonly connected to the positive electrodes of the power source.

Figure 5:
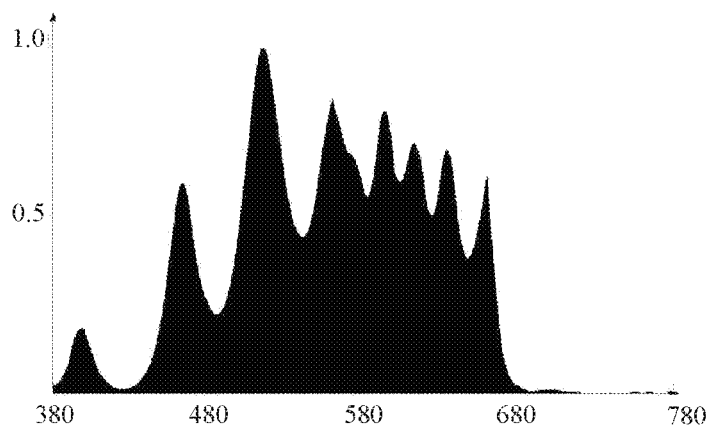
FIG. 5 is a visual representation from a spectrogram of the solar spectrum-like LED fluorescent lamp provided by Example 2 of the solar spectrum-like LED structure of the present invention.

After connecting the line to power, nine lights with different colors were emitted by LED chips (32) of LED21-LED29 with nine wavelengths, and mixed at the center of the designed semi-cylindrical surface to form a sector light source. A spectrum of solar spectrum-like LED fluorescent lamp can be obtained by adjusting the resistance values of resistors of R21-R29, respectively, and varying the current of LED21-LED29, respectively, thereby changing the proportions of nine lights in the mixed light. FIG. 5 is a spectrogram of the solar spectrum-like LED fluorescent lamp provided by Example 2 of the solar spectrum-like LED structure. An FMS-6000 light-color-electricity integrated test system was used for testing.

Example 3

Figure 6:
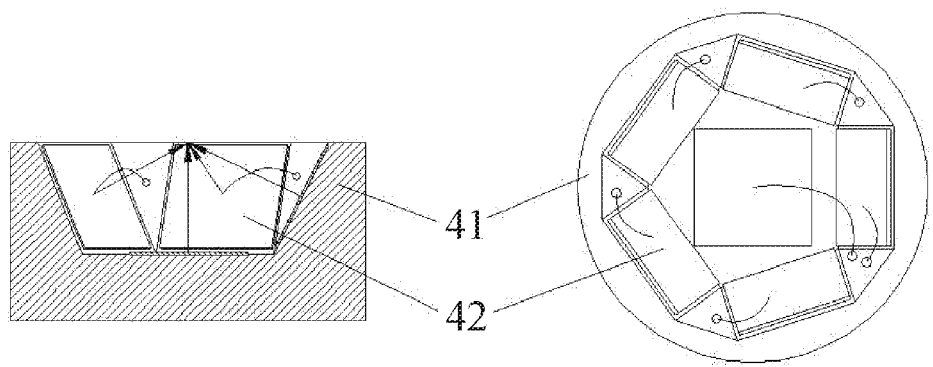
FIG. 6 is a structure diagram of Example 3 of the solar spectrum-like LED structure of the present invention.

FIG. 6 illustrates a structure diagram of Example 3 of the solar spectrum-like LED structure of the present invention, comprising a negative electrode for a three-dimensional integrated package (41) and a plurality of LED chips (42). In order to achieve a solar spectrum-like lighting insect-repelling LED spectrum, the negative electrode for a three-dimensional integrated package is a structure designed and based on the semi-spherical surface using six LED chips with different wavelengths. One chip is located at the center of the bottom of the electrode, thus, n=5.

The negative electrode for a three-dimensional integrated package is a structure designed and based on the semi-spherical surface having a plurality of planes thereon. The apex angles below the plurality of planes were interconnected into a regular polygon. The plane of the regular polygon was parallel to the plane of the designed semi-spherical surface, and the apex angles of the regular polygon were located on the designed semi-spherical surface. Two top apex angles above the plurality of planes were on the spherical surface where the plane of the designed semi-spherical surface was intersected with the semi-spherical surface. The lines from the center points of the plurality of planes to the center of the designed semi-spherical surface were separately perpendicular to each of the corresponding planes. The plurality of LED chips were separately installed on each plane, and each plane was correspondingly installed with one LED chip. A plurality of lights of different colors emitted by the plurality of LED chips formed a cone light source after being mixed at the center of the designed semi-spherical surface.

Six different LED chips with different wavelengths are normal chips with a size of 0.5 mm×0.5 mm, and their wavelength and the corresponding connected multiple resistors are as follows:

|  | LED31 | LED32 | LED33 | LED34 | LED35 | LED36 |
| --- | --- | --- | --- | --- | --- | --- |
| wavelength (nm) | 635 | 613 | 595 | 560 | 518 | 466 |
| resistors | R31 | R32 | R33 | R34 | R35 | R36 |

A chip is at the center of the bottom, n=5, the spacing between the two planes after the package is M=0.2 mm.

According to the size of the selected LED chip, the size of the package plane was designed as 0.6 mm×0.6 mm. Then, L=0.6 mm. According to the computational formula of radius of the structure designed and based on the semi-spherical surface, the radius was calculated as R=0.99 mm. Five square planes of 0.6 mm×0.6 mm were machined on the electrode designed and based on the semi-spherical surface. Another square of 0.6 mm×0.6 mm was located at the center of the regular pentagon at the bottom of the electrode, and the minimum spacing between each of the two planes was 0.2 mm. The lines from the center points of the six square planes to the center of the designed semi-spherical surface were separately perpendicular to each of the corresponding planes. The substrates of the six LED chips of LED31-LED36 were separately packaged on six square planes, and each plane was correspondingly installed with one LED chip. The light-emitting surfaces of six LED chips were separately faced toward the center of the designed semi-spherical surface. The light-emitting surfaces of the six LED chips of LED31-LED36 were separately connected to the resistors of R31-R36, and the other end of each of the six resistors was commonly connected to the positive electrodes of the power source.

Figure 7:
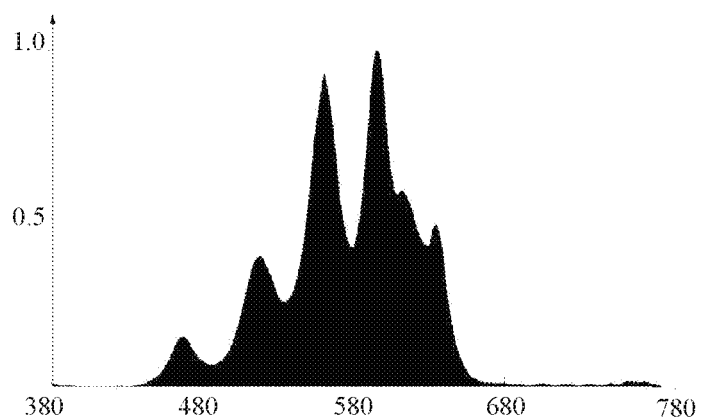
FIG. 7 is a visual representation from a spectrogram of the solar spectrum-like lighting insect-repelling LED fluorescent lamp provided by Example 3 of the solar spectrum-like LED structure of the present invention.

After connecting the line to power, six lights with different colors were emitted by LED chips of LED31-LED36 with six wavelengths, and mixed at the center of the designed semi-spherical surface to form a sector light source. A suitable lighting insect-repelling LED fluorescent lamp spectrum can be obtained by adjusting the resistance values of resistors of R31-R36, and varying the current of LED31-LED36, respectively, thereby changing the proportions of six lights in the mixed light. FIG. 7 is a spectrogram of the lighting insect-repelling LED fluorescent lamp provided by Example 3 of the solar spectrum-like LED structure of the present invention. An FMS-6000 light-color-electricity integrated test system was used for testing. It can be seen from FIG. 7 that the main peak wavelength of the spectrum has a minimum value of 581 nm, a maximum value of 601 nm, and a median value of 591 nm. The radiant flux of the wavelength of 530 nm~590 nm was greater than 50% of the radiant flux of the wavelength of 380 nm~780 nm, and the radiant flux of the wavelength of 380 nm~480 nm was less than 25% of the radiant flux of the wavelength of 380 nm~780 nm. The present Example can provide a suitable lighting insect-repelling LED fluorescent lamp.

Example 4

Figure 8:
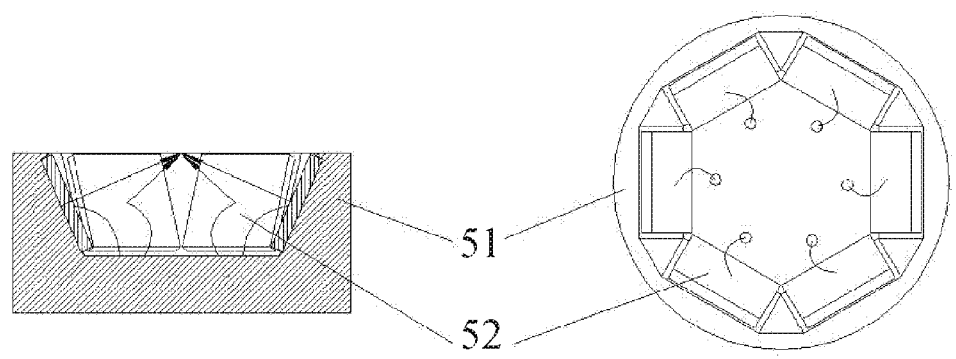
FIG. 8 is a structure diagram of Example 4 of the solar spectrum-like LED structure of the present invention.

FIG. 8 is a structure diagram of Example 4 of the solar spectrum-like LED structure of the present invention, comprising a negative electrode for a three-dimensional integrated package (51) and a plurality of LED chips (52). In order to achieve a solar spectrum-like myopia prevention LED fluorescent lamp spectrum, the negative electrode for a three-dimensional integrated package is a structure designed and based on the semi-spherical surface using six LED chips with different wavelengths. There was no chip at the bottom, thus, n=6.

Six different LED chips with different wavelengths are normal chips with a size of 0.5 mm×0.5 mm, and their wavelength and the corresponding connected multiple resistors are as follows:

|  | LED41 | LED42 | LED43 | LED44 | LED45 | LED46 |
| --- | --- | --- | --- | --- | --- | --- |
| wavelength (nm) | 635 | 615 | 596 | 560 | 518 | 467 |
| resistors | R41 | R42 | R43 | R44 | R45 | R46 |

There was no chip located at the bottom, n=6, and the spacing between the two planes after the package was M=0.15 mm.

According to the size of the selected LED chip, the size of the package plane was designed as 0.6 mm×0.6 mm. Then, L=0.6 mm. According to the computational formula of the radius of the structure designed and based on the semi-spherical surface, the radius was calculated as R=1.02 mm. Six square planes of 0.6 mm×0.6 mm were machined on the electrode designed and based on semi-spherical surface, and the minimum spacing between each of the two planes was 0.15 mm. The lines from the center points of the six square planes to the center of the designed semi-spherical surface were separately perpendicular to each of the corresponding planes. The electrode for a three-dimensional integrated package was connected with the negative electrode. The substrates of the six LED chips of LED41-LED46 were separately packaged on six square planes, and each plane was correspondingly installed with one LED chip. The light-emitting surfaces of six LED chips were separately faced toward the center of the designed semi-spherical surface. The light-emitting surfaces of the six LED chips of LED41-LED46 were separately connected to the resistors of R41-R46, and the other end of each of the six resistors were commonly connected to the same positive electrode of the power source.

Figure 9:
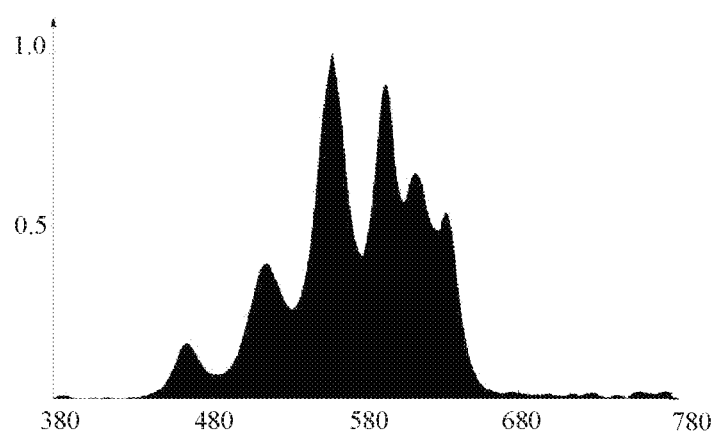
FIG. 9 is a visual representation from a spectrogram of the solar spectrum-like myopia prevention LED fluorescent lamp provided by Example 4 of the solar spectrum-like LED structure of the present invention.

After connecting the line to power, six lights with different colors were emitted by LED chips of LED41-LED46 with six wavelengths, and mixed at the center of the designed semi-spherical surface to form a cone light source. A suitable myopia prevention LED fluorescent lamp spectrum can be obtained by adjusting the resistance values of resistors of R41-R46, and varying the current of LED41-LED46, respectively, thereby changing the proportions of six lights in the mixed light. FIG. 9 illustrates a spectrogram of the myopia prevention LED fluorescent lamp provided by Example 4 of the solar spectrum-like LED structure of the present invention. An FMS-6000 light-color-electricity integrated test system was used for testing. It can be seen from FIG. 9 that the main peak wavelength of the spectrum has a minimum value of 550 nm, a maximum value of 570 nm, and a median value of 560 nm. The radiant flux of the wavelength of 530 nm~590 nm was greater than 50% of the radiant flux of the wavelength of 380 nm~780 nm, and the radiant flux of the wavelength of 380 nm~480 nm was less than 25% of the radiant flux of the wavelength of 380 nm~780 nm. The present example can provide a suitable solar spectrum-like myopia prevention LED fluorescent lamp.

In the description of the invention, it should be noted that the terms "center of the designed semi-spherical surface," "center of the designed semi-cylindrical surface," "center," "upper," "lower," "semi-cylindrical surface," "semi-spherical surface," "spacing" and the like indicate a directional and positional relationship based on the drawings, and are only for the purpose of describing the invention and simplifying the description, rather than indicating or implying that the referred device or element must have a specific shape, a specific shape structure and operation, and, therefore, cannot be construed as limiting the present invention. "Plane" can be a square plane, or a rectangular plane, or the plane of other shapes, depending on the shape of the selected chips. Unless otherwise expressly stipulated and specified, the terms "install," "package," "connect," "connected," "machined," "manufacture," "manufactured" and the like should be understood in a broad sense. For example, the connection may be a mechanical connection or an electrical connection, either a direct connection or indirectly connected through an intermediate medium or an internal connection of the two elements. It will be apparent to those skilled in the art that the specific meaning of the above terms in the present invention may be understood according to the particular situation. In addition, unless otherwise specified, in the description of the present invention, the meaning of "a plurality of" is two or more.

The specific embodiments of the invention described above are not to be construed as limiting the scope of the invention. Any other changes and modifications that may be made in accordance with the technical concept of the invention are intended to be included within the scope of the appended claims.

What is claimed is:

1. A solar spectrum-like LED structure, comprising:

a negative electrode for a three-dimensional integrated package, wherein the negative electrode for a three-dimensional integrated package is a three-dimensional structure comprising a plurality of planes;

a plurality of LED chips each having a respective light-emitting surface, wherein the plurality of LED chips are installed on the plurality of planes of the negative electrode for the three-dimensional integrated package, and wherein each plane is correspondingly installed with one LED chip of the plurality of LED chips; and a plurality of resistors, wherein an end of at least one of the plurality of resistors is connected to at least one light-emitting surface of the plurality of LED chips, and wherein another end of at least one of the plurality of resistors is connected to a positive electrode; and wherein:

the negative electrode for a three-dimensional integrated package is a structure design based on a semi-cylindrical surface having a plurality of planes thereon;

lines from a center point of each plane to a center point of a designed semi-cylindrical surface are separately perpendicular to each of the corresponding planes;

the plurality of LED chips are separately installed on each plane;

each plane is correspondingly installed with one LED chip of the plurality of LED chips; and a computational formula of a design radius of the structure design based on the semi-cylindrical surface is as follows:

$$Ra = \frac{1}{2}(L+M)/\sin\frac{90°}{n}$$

wherein L is a size of an edge of one LED chip of the plurality of LED chips, M is a spacing between the LED chips, n is a number of the LED chips, and Ra is the design radius of an electrode designed and based on the semi-cylindrical surface.

2. The solar spectrum-like LED structure according to claim 1, wherein:

the negative electrode for a three-dimensional integrated package is a three-dimensional structure comprising a plurality of planes;

lines from center points of the plurality of planes to a designed intersection point are separately perpendicular to each of the corresponding planes;

the plurality of LED chips are separately installed on each plane; and each plane is correspondingly installed with one LED chip of the plurality of LED chips.

3. The solar spectrum-like LED structure according to claim 1, wherein:

the plurality of resistors comprises a plurality of variable resistors; and a spectrum of mixed light can be varied by varying a resistance of the plurality of resistors, varying a current through the corresponding LED chips and controlling a proportion of each monochromatic light in the spectrum of mixed light.

4. The solar spectrum-like LED structure of claim 1, wherein light of a plurality of colors emitted by the plurality of LED chips generates a spectrogram of solar spectrum-like lighting insect-repelling LED fluorescent lamp after being mixed at a designed intersection point, and the spectrogram comprises:

a radiant flux of wavelengths between 530 nm and 590 nm being greater than 50% of a radiant flux of wavelengths between 380 nm and 780 nm;

a main peak wavelength of the spectrum having a minimum value of 581 nm, a maximum value of 601 nm, and a median value of 591 nm; and a radiant flux of wavelengths between 380 nm and 480 nm being less than 25% of the radiant flux of the wavelengths between 380 nm and 780 nm.

5. The solar spectrum-like LED structure of claim 1, wherein light of a plurality of colors emitted by the plurality of LED chips generates a spectrogram of solar spectrum-like myopia prevention LED fluorescent lamp after being well mixed at a designed intersection point, and the spectrogram comprises:

a radiant flux of wavelengths between 530 nm and 590 nm being greater than 50% of a radiant flux of wavelengths between 380 nm and 780 nm;

a main peak wavelength of the spectrum having a minimum value of 550 nm, a maximum value of 570 nm, and a median value of 560 nm, and a radiant flux of wavelengths between 380 nm and 480 nm being less than 25% of the radiant flux of the wavelengths between 380 nm and 780 nm.

6. An LED light source module, wherein the LED light source module applies the LED structure of claim 1.

7. A solar spectrum-like LED structure, comprising:

a negative electrode for a three-dimensional integrated package, wherein the negative electrode for a three-dimensional integrated package is a three-dimensional structure comprising a plurality of planes;

a plurality of LED chips each having a respective light-emitting surface, wherein the plurality of LED chips are installed on the plurality of planes of the negative electrode for the three-dimensional integrated package, and wherein each plane is correspondingly installed with one LED chip of the plurality of LED chips; and a plurality of resistors, wherein an end of at least one of the plurality of resistors is connected to at least one light-emitting surface of the plurality of LED chips, and wherein another end of at least one of the plurality of resistors is connected to a positive electrode;

wherein:

the negative electrode for the three-dimensional integrated package is a structure design based on a semi-spherical surface having a plurality of planes thereon;

a plurality of apex angles below the plurality of planes are interconnected into a regular polygon;

a plane of the regular polygon is parallel to a plane of the designed semi-spherical surface;

the plurality of apex angles of the regular polygon are located on the designed semi-spherical surface;

wherein two top apex angles of the plurality of apex angles above the plurality of planes are located on a spherical surface that intersects with the structure design;

lines from the center points of the plurality of planes to a center point of the structure design are separately perpendicular to each of the corresponding planes;

the plurality of LED chips are separately installed on each plane;

each plane is correspondingly installed with one LED chip of the plurality of LED chips; and a computational formula of a design radius of the structure designed and based on the semi-spherical surface is as follows:

$$Ra = \frac{1}{2}(L+M)\sqrt{\frac{1}{4}\left[\tan\frac{90°(n-2)}{n} + \sqrt{\left(\tan\frac{90°(n-2)}{n}\right)^2 + 8}\right]^2 + 1}$$

wherein L is a size of the edge of one LED chip, M is a spacing between the LED chips, n is a number of the LED chips, n≥3, and Ra is the design radius of an electrode design based on the semi-spherical surface.

* * * * *

UNITED STATES PATENT AND TRADEMARK OFFICE
CERTIFICATE OF CORRECTION

| | | |
|---|---|---|
| PATENT NO. | : 10,480,750 B2 | Page 1 of 1 |
| APPLICATION NO. | : 15/510060 | |
| DATED | : November 19, 2019 | |
| INVENTOR(S) | : Rui Xie and Liling Lin | |

It is certified that error appears in the above-identified patent and that said Letters Patent is hereby corrected as shown below:

In the Specification
Column 5,    Line 9,    change "designed or based" to --designed and based--

Signed and Sealed this
Fifth Day of May, 2020

Andrei Iancu
*Director of the United States Patent and Trademark Office*